United States Patent [19]

Munemoto et al.

[11] Patent Number: 5,495,371
[45] Date of Patent: Feb. 27, 1996

[54] MAGNETIC TAPE LIBRARY DEVICE AND METHOD FOR MAINTAINING MAGNETIC RECORDING AND REPRODUCING DEVICE AND MAGNETIC HEAD

[75] Inventors: Takayuki Munemoto; Kazuo Sakai, both of Ibaraki; Fujio Tajima, Tsuchiura; Tomokazu Ishii, Ibaraki; Fumio Takeda, Ushiku; Kouetsu Okuyama, Tsuchiura; Takeshi Itoh; Shigeyuki Kobata, both of Odawara; Kenmei Masuda, Yokohama; Shigemitsu Higuchi, Fujisawa, all of Japan

[73] Assignee: Hitachi, Ltd., Tokyo, Japan

[21] Appl. No.: 158,315

[22] Filed: Nov. 29, 1993

[30] Foreign Application Priority Data

Nov. 30, 1992 [JP] Japan ................... 4-320400

[51] Int. Cl.$^6$ .................................... G11B 15/18
[52] U.S. Cl. ................... 360/71; 360/69; 360/137
[58] Field of Search ............... 360/69, 128, 137, 360/71; 369/71, 72

[56] References Cited

U.S. PATENT DOCUMENTS

| 4,937,690 | 6/1990 | Yamashita et al. | 360/69 |
| 5,088,082 | 2/1992 | Yamada et al. | 360/69 |
| 5,193,033 | 3/1993 | Shimoi et al. | 360/128 |
| 5,196,979 | 3/1993 | Saito | 360/137 |

FOREIGN PATENT DOCUMENTS

| 0288415 | 11/1988 | Japan | 360/137 G |
| 0419604 | 3/1992 | Japan . | |
| 0605251 | 4/1978 | U.S.S.R. | 360/137 G |

*Primary Examiner*—Aristotelis Psitos
*Assistant Examiner*—Varsha A. Kapadia
*Attorney, Agent, or Firm*—Antonelli, Terry, Stout & Kraus

[57] ABSTRACT

A magnetic recording and reproducing device and a magnetic tape library device are provided for properly recovering a function and issuing a warning when a failure of a magnetic head of the device takes place because of wear and dirt of the magnetic head. Further, a method for maintaining the magnetic head is provided. A wear sensor and a dirt sensor are prepared for sensing a wear amount of a state of dirt of the magnetic head. A head check controller operates to determine the wear amount of the magnetic head and the state of dirt based on the sensed result. In accordance with the determined result, the warning device is started for taking a precaution of preventing a head failure. As one aspect, the tape library device instructs to load the cleaning tape using a robot.

11 Claims, 18 Drawing Sheets

MAGNETIC TAPE LIBRARY DEVICE AND METHOD FOR MAINTAINING MAGNETIC RECORDING AND REPRODUCING DEVICE AND MAGNETIC HEAD

BACKGROUND OF THE INVENTION

The present invention relates to a method for maintaining a magnetic recording and reproducing device and a magnetic head, which method enables prevention of failure resulting from wear and dirt of a magnetic head and a library device which includes a container for storing many cartridges, each for holding a reel around which a magnetic recording medium (magnetic tape) is wound.

The magnetic recording and reproducing device for recording or reproducing information on a magnetic recording medium through a magnetic head has conventionally suffered from some shortcomings such as lowering of a signal-to-noise (S/N) ratio or reliability of the recording and reproducing systems resulting from dirt or wear of the magnetic head.

To overcome the shortcoming of dirt, there has been conventionally used a method in which a cleaning tape is moved in contact with the magnetic head for removing dirt of the head or in which a cleaning liquid is directly adapted to the magnetic head. To overcome the shortcoming of wear, replacement of the wear-out magnetic head is the only way. However, various techniques have been proposed for grasping when the head is to be replaced, that is, sensing an amount of wear of the magnetic head. For example, JP-B-4-19604 (JP-A-59-193519) published in Mar. 2, 1992 discloses a technique of sensing an amount of wear based on change of impedance of a magnetic head according to reduction of a sectional area of a gap part of a magnetic head core.

By the way, it is likely that a typical information device is concentratively managed from a remote place according to increase of an amount of information to be processed. Such a remote control operation is requested to be automatically operated without any maintenance operator. Under this circumstance, the reliability of a device itself is required to be enhanced in place of no maintenance operator. Further, if failure takes place in the device, it is desirous for the device to automatically recover the failed function. Alternatively, by presuming a possibility of occurrence of failure and issuing a warning before actual occurrence of failure, it is necessary to repair the device before the device is made inoperative.

As a representative example, a magnetic tape library device may be referred. The magnetic tape library device is a device arranged to automatically store as numerous magnetic tape (MT) cartridges as about 500 to 7000, selectively pick up one of these cartridges with a robot, set the picked cartridge to a magnetic tape device composing a recording and reproducing device, and return the magnetic tape to the original storage place after it is reproduced with the robot. This type of magnetic tape library device may be used for backing up a magnetic disk device whose volume is likely to be larger or for a broadcasting business. The library device is arranged to hold about 4 to 40 magnetic tape devices and at least two robots. It implements substantially complete automatic exchange and storage of a magnetic tape. In this kind of magnetic tape device, failure resulting from wear or dirt of a magnetic head remarkably lowers the reliability of the device. The wear of the magnetic head lowers a reproduced output voltage level in a long-term range, finally causing the magnetic head itself to be unserviceable. The time from a first use start to the time when the head becomes unserviceable is called a life of a head. In this case, it is necessary to replace the magnetic head. In the circumstances where the magnetic tape device is remotely operated by a computer, it is necessary to exactly grasp when the head is to be replaced. The wear of the magnetic head lowers a reproduced output. This lowering takes place at a shorter period than the life of a head, that is, frequently. To overcome dirt of the magnetic head, as mentioned above, the head cleaning is executed. From a viewpoint of simplifying the remote operation and the maintenance, the magnetic tape library is required to automatically execute the head cleaning operation if necessary. On the other hand, the conventional technique needs a maintenance operator to determine the state of the magnetic head with his or her eyes and when the head is replaced or cleaned according to the determined state. It means that the conventional technique cannot cope with the remote-control management and the automated function recovery of the magnetic tape library device.

SUMMARY OF THE INVENTION

It is an object of the present invention to provide a method for maintaining a magnetic recording and reproducing device and a magnetic head used for it which method enables to individually recognize a kind of failure resulting from wear or dirt of a magnetic head and automatically execute the most approximate treatment for each kind of failure, for maintaining the reliability of the device and enabling the remote control of the device.

It is another object of the present invention to provide a device arrangement which makes it possible to automate maintenance management of a magnetic head in a magnetic tape library device for storing a massive number of magnetic tapes and selectively pick up one of the tapes for recording or reproducing information on or from the picked-up tape.

In carrying out the object, according to an aspect of the invention, a magnetic tape library device is arranged to automatically store plural magnetic tapes, pick up a magnetic tape from the stored place, set the picked magnetic tape to a magnetic recording and reproducing device and return it to the stored place with one or more robots. The magnetic tape library device includes means for sensing an amount of wear on a magnetic tape provided in the magnetic recording and reproducing device; means for sensing dirt of the magnetic head; means for issuing a warning in accordance with the wear and/or the dirt of the magnetic head; means for cleaning the magnetic head; and a controller for controlling the wear sensing means and the dirt sensing means, determining a state of the wear or the dirt of the magnetic head based on the outputs of the sensing means, and determining and indicating the later processing containing starting operations of the warning means and the head cleaning means in accordance with the determined result.

According to another aspect of the present invention, a magnetic recording and reproducing device is arranged to record information on a magnetic recording medium through a magnetic head or reproduce information from the magnetic recording medium. The magnetic recording and reproducing device includes means for sensing an amount of wear of the magnetic head by sensing change of impedance of the magnetic head; means for sensing dirt of the magnetic head based on an amplitude of a signal reproduced by the magnetic head; means for issuing a warning in accordance with the wear and/or the dirt of the magnetic head; means for cleaning the magnetic head; and a controller for controlling the wear sensing means and the dirt sensing means, determining the states of wear and/or dirt of the magnetic head on the outputs of the sensing means, and determining and indicating the later process containing starting operations of the warning means and the head cleaning means in accordance with the determined states.

According to another aspect of the present invention, a method for maintaining a magnetic head in checking of the magnetic head of a magnetic recording and reproducing device for recording information on a magnetic recording medium through a magnetic head or reproducing information from the magnetic recording medium, comprises the steps of determining execution timing of a head check based on a time passed from the previous head check of the magnetic head, an occurrence ratio of an error about data when recording or reproducing the information or a retry time of recording and reproducing operations and the current operating state; sensing an amount of wear on the magnetic head; issuing a warning or stopping the device according to the sensed wear state; if the magnetic head is serviceable and only the issuance of the warning is executed, loading a magnetic recording medium on which information is to be recorded or reproduced or a dedicated magnetic recording medium for checking dirt of the head to the magnetic recording and reproducing device, sensing dirt of the magnetic head by using the medium; executing issuance of a warning according to the dirt status, a head cleaning operation, and re-sensing of dirt after the head is cleaned; repetitively executing the head cleaning operation and the re-sensing of dirt according to the re-sensed result of the dirt and removing the dirt of the head specified times or until the specified time is passed; and if the magnetic head is unserviceable and the device is stopped in spite of the repetitive operations, transmitting a signal standing for the stop to an upper controller.

Further, the library device according to another aspect of the present invention adopts the maintaining scheme as summarized above as a method for maintaining the magnetic head.

In the library device or the magnetic recording and reproducing device according to the aspects of the present invention, the wear and the dirt of the magnetic head are sensed by the wear sensing means and the dirt sensing means. The amount of wear and the state of the dirt are determined by the controller. The indication for issuing a warning to the warning means according to the determined result is given and the cleaning process is executed by the cleaning means.

DESCRIPTION OF THE PREFERRED EMBODIMENTS

Hereafter, an embodiment of the present invention will be described with reference to the appended drawings.

Figure 1:
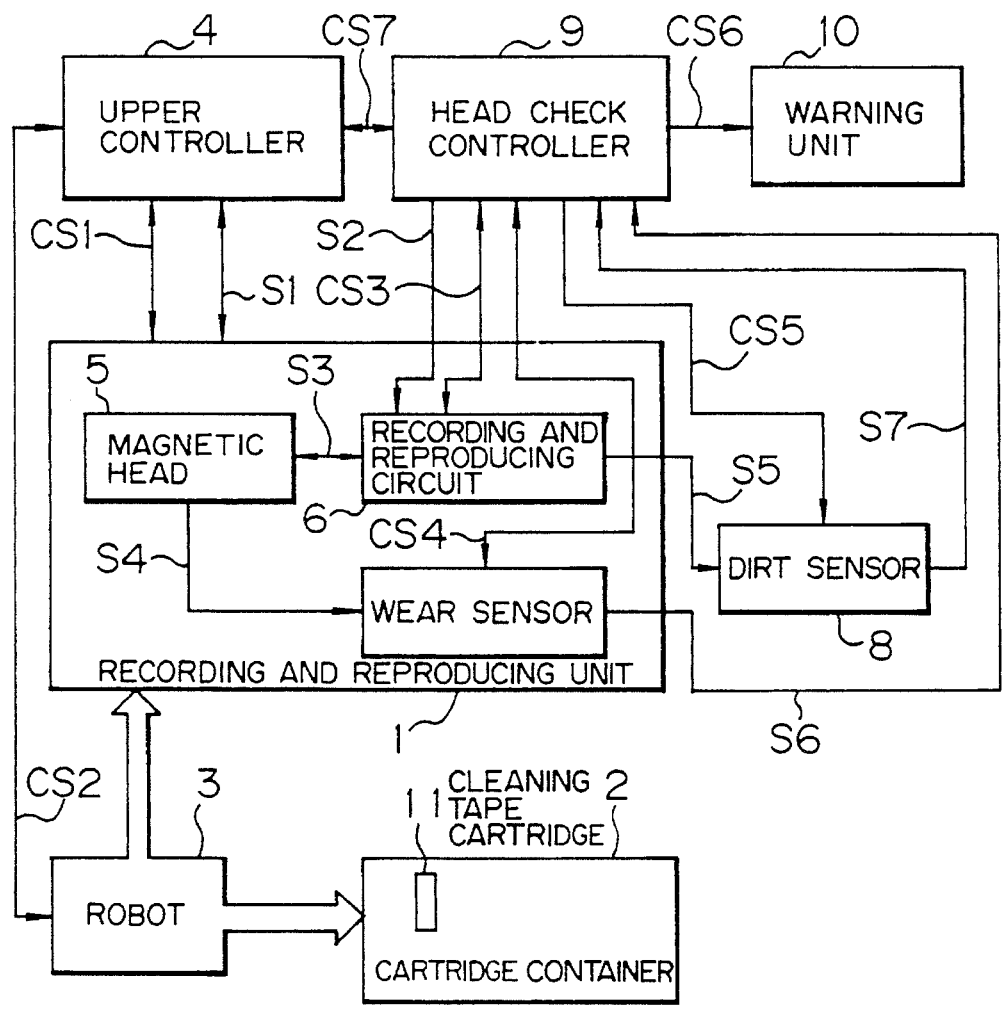
FIG. 1 is a block diagram showing a library device having a head maintenance function according to an embodiment of the present invention.

FIG. 1 shows an arrangement of a magnetic tape library device served as a magnetic recording device according to an embodiment of the present invention. This library device is a device for storing and managing a large number of magnetic tapes. The library device is arranged to have a magnetic recording and reproducing unit 1, a cartridge container 2 for storing 500 to 7000 magnetic tape cartridges, a robot 3, an upper controller 4, a wear sensor 7 for sensing an amount of wear of a head, a dirt sensor 8 for sensing dirt of a head, a head check controller 9, a warning unit 10, control signal lines CS1 to CS7, and signal lines S1 to S7. Herein, sensing of a wear amount of the head, sensing of dirt, head cleaning and various warnings will be hereafter referred to as a head maintenance or a head maintenance system. The disk controller 9 is provided in each recording and reproducing unit. Or, it may be provided commonly for each group of a few recording and reproducing units, for example.

The magnetic recording and reproducing unit 1 is arranged to have a contact type magnetic head (head) 5 like a rotary-type head, a recording and reproducing circuit 6, a mechanism (not shown) for running a magnetic recording medium like a magnetic tape and a control unit (not shown). The library device typically includes plural magnetic recording and reproducing units 1 and the wear sensors 7 for respective units 1.

The robot 3 operates to pick up a given cartridge (magnetic tape) from the cartridge container 2 for holding plural cartridges, load the cartridge to the magnetic recording and reproducing unit 1, unload the cartridge from the magnetic recording and reproducing unit 1, and return it to the cartridge container 2. The magnetic recording and reproducing unit 1 records information on the magnetic tape or reads (reproduces) the information from the magnetic tape. These typical operations are controlled by the upper controller 4 through the control signal lines CS1 and CS2. Another kind of information indicating an operating state of the magnetic recording and reproducing unit 1 or the robot 3 is conveyed to the upper controller 4 through the control signal lines CS1 and CS2. The average time taken in loading or unloading the magnetic tape to or from the cartridge container is as high as about 10 seconds. Though not illustrated, the control based on one robot is limited. Hence, two robots are used for realizing more efficient control. The library device provides about four to forty recording and reproducing units. The above-mentioned robot operation and signal transmission between the upper controller 4 and robot 3 and unit 1 may be made by known techniques.

The wear sensor 7 operates to detect an amount of wear of the magnetic head 5 brought about by sliding the magnetic tape against the magnetic head 5. The wear sensor 7 employs another method rather than a method for monitoring an amplitude of a reproduced signal of the magnetic head 5. The head check controller 9 serves to predict or estimate the amount of wear of the magnetic head in response to the output of the wear sensor 7, and operates to generate a signal indicating that the magnetic head comes closer to a critical point of wear a certain length of time before the amount of wear of the magnetic head reaches the critical point. By using another method except the method for monitoring an amplitude of the reproduced signal, it is possible to eliminate the adverse effect on the sensing, caused by dirt of the magnetic head.

This wear sensor 7 may use means for sensing impedance as described in the foregoing JP-B-4-19604. In place, it goes without saying that a known wear sensor having the similar function may be used. By reference, this embodiment to which the means for sensing impedance applies is shown in FIG. 3.

Figure 3:
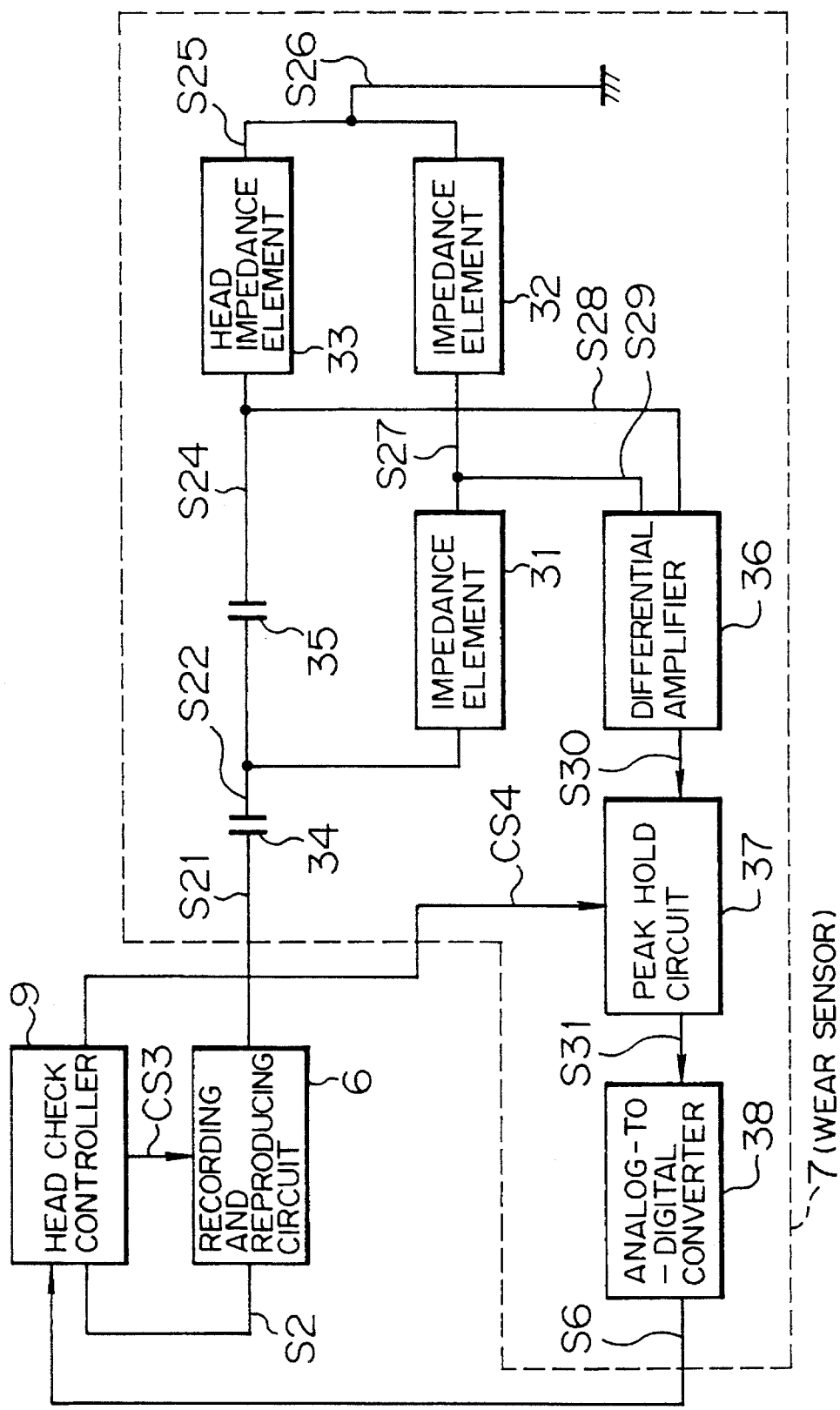
FIG. 3 is a block diagram showing an arrangement in which means for sensing impedance may apply to the present invention.

In FIG. 3, the head check controller 9 operates to set the recording and reproducing circuit 6 to a recording mode through the effect of the control signal line CS3 so that a signal having a predetermined frequency may be inputted to the recording and reproducing circuit 6 through a signal line S2. The head check controller 9 provides an oscillator for generating the signal of a predetermined frequency.

The change of the impedance 33 of the magnetic head 5 based on the amount of wear of the head is properly modified by a differential amplifier 36 as change of a potential difference between signal lines S24 and S27. The differential amplifier 36 serves to apply an output signal to a peak hold circuit 37 for detecting the amplitude of the signal. The amplitude is converted to numerical data through the effect of an analog-to-digital converter 38. The numerical data is applied to a head check controller 9 on a signal line S6. To enhance the reliability of the sensing, the peak hold circuit 37 provides discharge means for discharging a voltage at a proper speed rate in accordance with an instruction of CS4. Thus, the peak hold circuit 37 repeats a peak detection using the CS4 instruction plural times to perform an averaging process.

Such repetitive detections or an averaging process is performed by the head check controller 9. The averaged amplitude data applied to the head check controller 9 is compared with an inputted allowable value. At this time, it is preferable that several kinds of allowable values are prepared according to how much the head is worn and the characteristics of each magnetic head. These allowable values may be stored in a ROM provided inside of the head check controller 9. Or, they may be read from an external storage unit such as a magnetic disk unit when starting the library device and be stored in a RAM. In place, those allowable values may be inputted by another input unit such as a keyboard. Herein, it is desirous that the data stored in the RAM or the external storage unit may be changed by another input unit.

Figure 2:
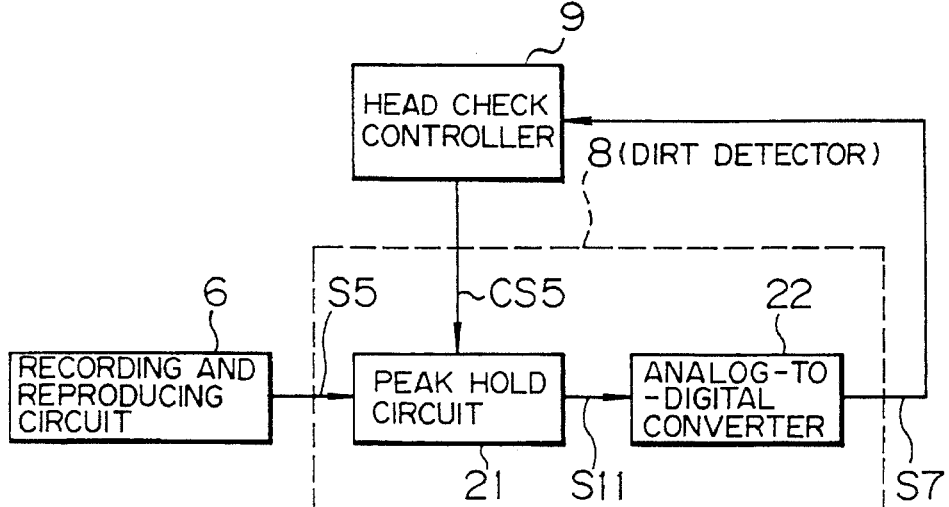
FIG. 2 is a block diagram showing an arrangement of means for sensing dirt used in the embodiment shown in FIG. 1.

The dirt sensor 8 operates to presume dirt of the magnetic head by monitoring an amplitude of a reproduced signal of the magnetic head. For example, as shown in FIG. 2, the dirt sensor 8 is composed of the peak hold circuit 21 and the analog-to-digital (A/D) converter 22 and operates to detect change of an amplitude of a reproduced signal depending on the dirt of the magnetic head. The head check controller 9 presumes how dirty the magnetic head is.

In the case of the arrangement shown in FIG. 2, when a signal indicating a start of sensing the dirt is applied from the head check controller 9 to the control signal line CS5, the peak hold circuit 21 starts to charge itself and outputs a voltage corresponding to an amplitude of the reproduced signal. This voltage is applied to the analog-to-digital converter 22 in which the voltage is converted into the numerical data. Then, the numerical data is inputted to the head check controller 9. At this time, to enhance the reliability of the sensing, the same method as the method to be done by the wear sensor 7, for example, the repetitive sensings or the averaging process, is carried out.

The head check controller 9 operates to compare the numerical data of a voltage corresponding to an amplitude of the reproduced signal with a pre-specified allowable value or an allowable range of an amplitude of a reproduced signal and presume how dirty the head is, based on the compared result. In this assumption, the amount of wear sensed by the wear sensor 7 may be referred. That is, the allowable value, that is, the allowable range of the amplitude of the reproduced signal is guided as considering the sensed result of the wear sensor 7.

When the dirt of the head is determined to exceed a certain level, the head check controller 9 operates to issue a signal for requesting to do head cleaning. In this embodiment, a method is employed for using a tape dedicated for cleaning the head, that is, a cleaning tape.

The request signal of the head cleaning is transmitted to the upper controller 4 through the control signal line CS7. The upper controller 4 issues an instruction for loading a cleaning tape cartridge 11 to the magnetic recording and reproducing unit 1 and the robot 3 through the control signal lines CS1 and CS2, respectively. The robot 3 operates to load the cartridge 11 to the magnetic recording and reproducing unit 1 and the mechanical system of the magnetic recording and reproducing unit 1 operates to set the cleaning tape to a tape running system. Completion of setting the cleaning tape is transmitted to the upper controller on the control signal lines CS1 and CS2. Further, it is transmitted to the head check controller 9 on the control signal line CS7. Later, running and stopping of the cleaning tape or execution of the head cleaning and the head check is controlled by the head check controller 9.

When the cleaning tape is used for cleaning the head, it is necessary to sense the dirt of the head and replace a new cartridge on which a dirt sensing tape is wound with a cartridge on which a cleaning tape is wound. The time taken in replacing the cartridges with each other gives a considerable length of loss time to the system. This loss time can be improved by using a dedicated tape (referred to as a check and cleaning tape) composed of a tape dedicated to the head check (referred to as a check tape) and the cleaning tape connected alternately with each other. In place of using the cleaning tape, a member for cleaning the head (cleaning member) may be provided nearby the head and a mechanism may be provided for pressing the cleaning member onto the head in response to an instruction from the head check controller 9.

The head check controller 9 operates to control the component means when maintaining the head, presume an amount of wear and dirt of the magnetic head 5 based on the sensed results of the wear sensor 7 and the dirt sensor 8 and indicate to issue a warning or do a head cleaning operation. This kind of function may be provided in the upper controller 4. Further, if the amount of wear of the magnetic head exceeds a critical point or the dirt of the magnetic head is not improved, a signal indicating it is sent to the upper controller so that the magnetic recording and reproducing unit may not be used after that.

Figure 4:
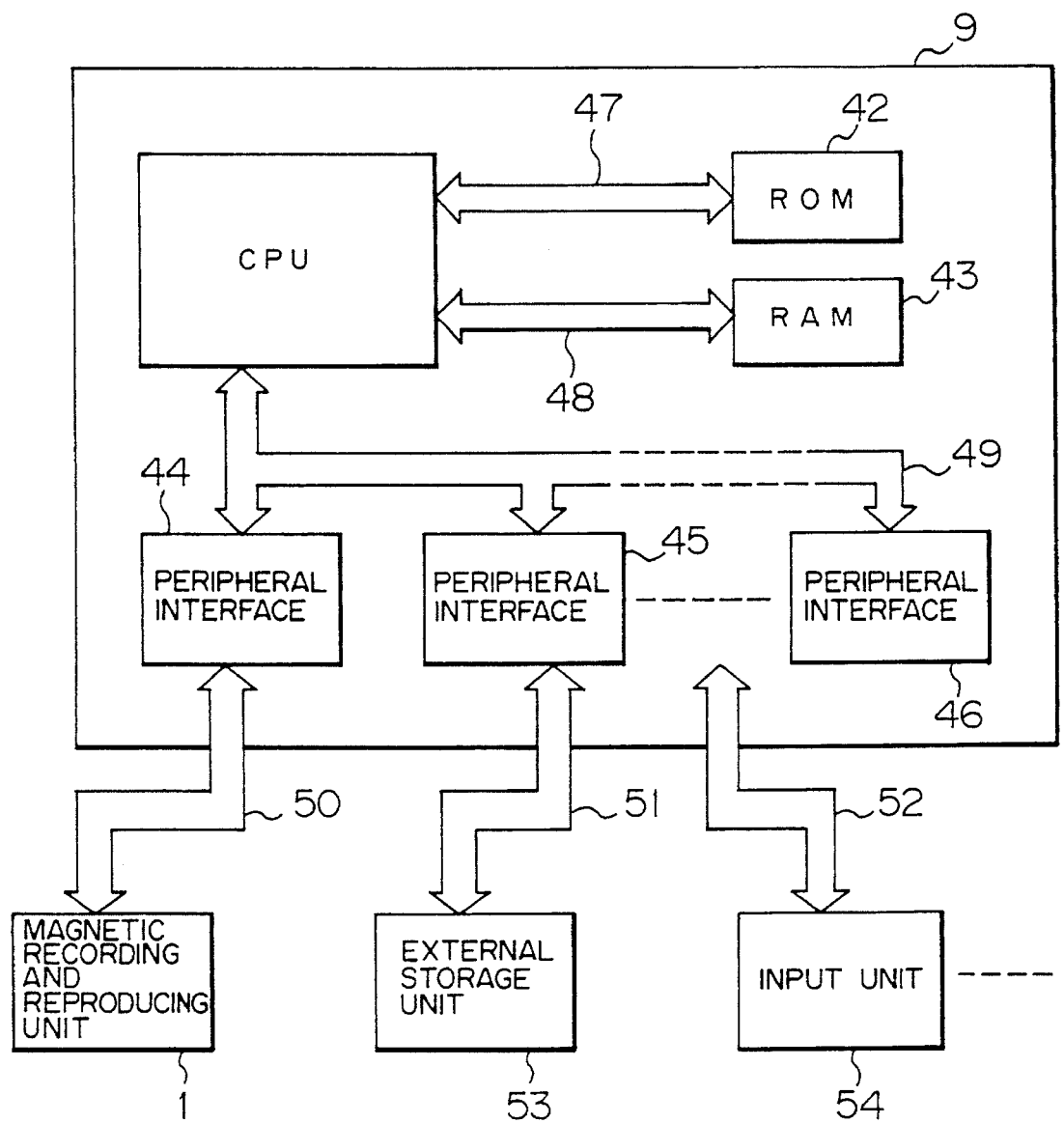
FIG. 4 is a block diagram showing an arrangement of a controller for checking a head.

The head check controller 9 is arranged to have a CPU 41, a ROM 42, a RAM 43, peripheral interfaces 44 to 46 and signal lines 47 to 52 as shown in FIG. 4. The peripheral interfaces 44 to 46 are connected to an input unit 54, an external storage unit 53, the magnetic recording and reproducing unit 1 and so forth. The ROM 42 pre-stores a program or data needed for checking the head. The RAM 43 stores data or a program inputted from the external storage unit 53 and the input unit 54. The CPU 41 operates to control the comparing and relating device or means for presuming the amount of wear and/or the dirt of the head.

The warning unit 10 is used for notifying an operator of the dirt of the head or the fact that the wear of the head comes close to the critical point. In response to an instruction of the head check controller 9, the warning unit 10 operates to light up a lamp or display a message on a terminal display.

Next, the description will be oriented to an operation of maintaining the head.

Figure 5:
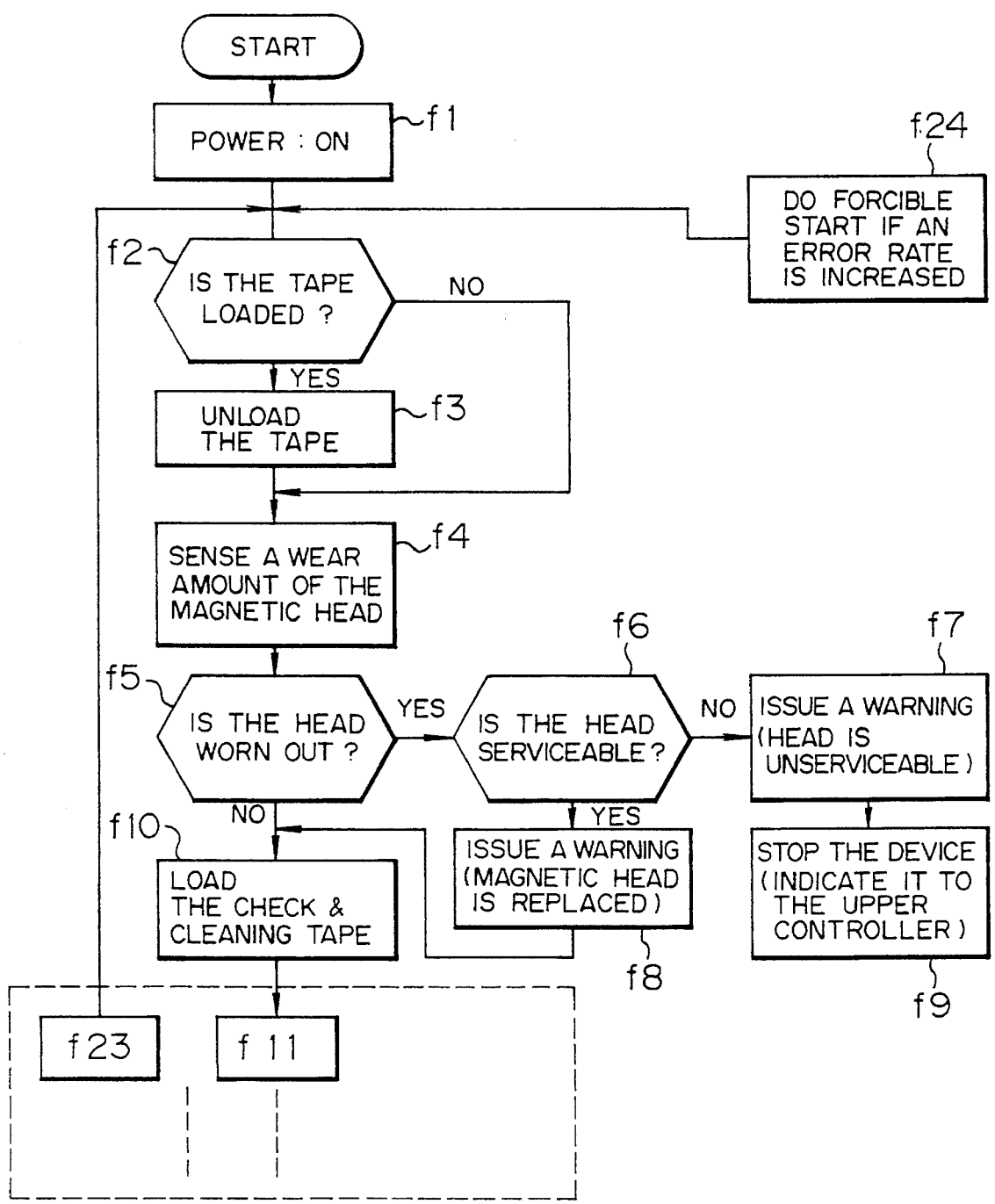
FIG. 5 is a flowchart showing a head maintenance method in the case of executing the head maintenance when powered.
Figure 6:
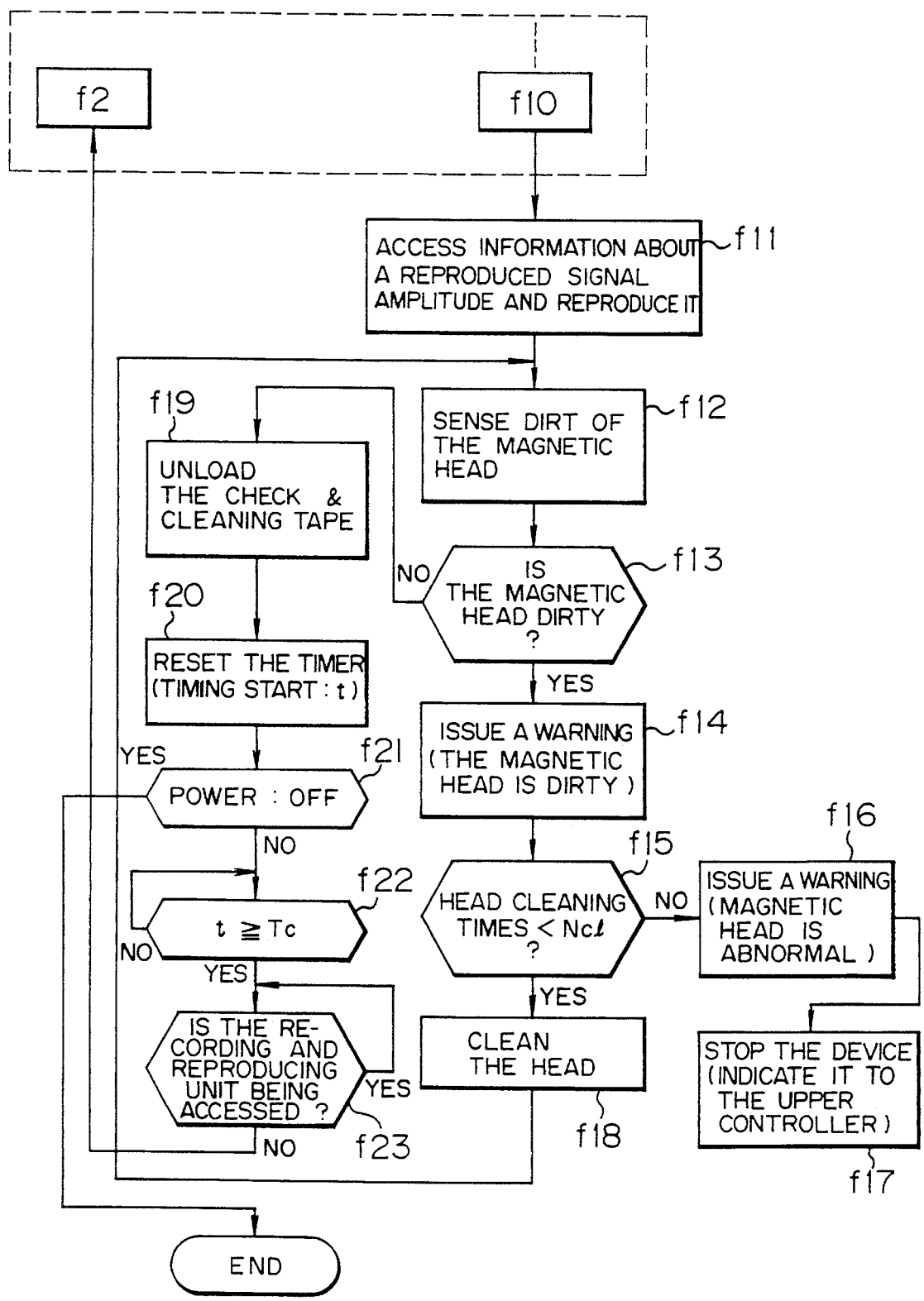
FIG. 6 is a flowchart showing a head maintenance method in the case of executing the head maintenance when powered.

FIGS. 5 and 6 show an embodiment of a head maintenance system in which the wear sensing or the dirt sensing of the magnetic head is done by using the check and cleaning tape and if the dirt is sensed, the head cleaning is automatically done.

In addition, on the check and cleaning tape, a data signal (referred to as check data) for obtaining a reproduced signal required for sensing dirt of the magnetic head is pre-recorded. Together with the data signal, the information about an amplitude of the reproduced signal to be obtained when this check data is reproduced is also recorded on the check and cleaning tape.

In this embodiment, the head maintenance operation is done when powered (step f1). For that purpose, the operation is executed to check that the tape is not loaded to the magnetic recording and reproducing unit 1 (step f2). If it is loaded, the tape is unloaded.

Next, the amount of wear of the magnetic head is sensed (step f4) and it is checked whether or not the head is worn. In this embodiment, at first, it is determined whether or not the amount of wear reaches a certain amount, that is, a critical wear amount 1 (step f5). If not, it is determined that no wear takes place. If it exceeds the critical wear amount 1, it is further determined whether or not the head wear enters into the unserviceable level, that is, a critical wear amount 2 (step f6). Provision of the critical wear amount 1 and the critical wear amount 2 makes it possible to exchange the magnetic head before the magnetic head becomes unserviceable, that is, exceeds the critical wear amount 2. In place of providing such threshold values as the critical wear amounts 1 and 2, the constant display of the wear amount or the threshold value and the wear amount may be executed for achieving the objects of this embodiment.

If the actual amount of wear exceeds the critical wear amount 1 but does not exceed the critical wear amount 2, it is determined that the actual wear amount is close to a serviceable threshold of the head. According to the determined result, a warning is issued for prompting the magnetic head to be replaced with a new one (step f8) and then the later maintenance items are executed. The maintenance items are the same as those executed for the case where the wear amount of head does not exceed the critical wear amount. If it exceeds the critical wear amount 2, it is displayed that the magnetic head is made unserviceable (i.e. the actual wear amount of the head does not reach the serviceable threshold value) and the sensor notifies the upper controller of the fact so that the upper controller may force the device to fall into a waiting state (step f9) until a new magnetic head is replaced with the unserviceable head.

If the actual wear amount does not exceed the critical wear amount 1, the check and cleaning tape is loaded to the device so that the device may access information about an amplitude of a reproduced signal recorded on the tape and reproduce it (step f11). The information about a reproduced signal amplitude is a reference of a reproduced signal amplitude to be obtained when the magnetic head reproduces the check data and the data is amplified up to a predetermined level. That is, the check and cleaning tape may hold the signal amplitude itself thereon or data indicating a tape type so that a reference value of the reproduced signal amplitude may be determined on the tape type. In the latter case, it is necessary to prepare a table having reproduced signal amplitude reference values against various types of tapes. Further, if the kind and the characteristic of a tape to be used are restricted and the reference value of the reproduced signal amplitude is defined, it is not necessary to record the information about a reproduced signal amplitude on the check and cleaning tape. Hence, the process for accessing the information about a reproduced signal amplitude and reproducing it is allowed to be removed (step f11).

In succession, the dirt of the magnetic head is sensed (step f12). The dirt of the magnetic head is determined on the reproduced signal amplitude of the check data as mentioned earlier. In this embodiment, the reproduced signal holds a signal of a fixed frequency or a fixed wavelength as check data in advance. The dirt is determined on the comparison of the signal amplitude with the information about the reproduced signal amplitude when the check data is reproduced from the tape.

If it is determined that the magnetic head becomes dirty at the step f13, a warning is issued (step f14) so as to clean the head (step f15). After the head is cleaned, the operation returns to the dirt sensing step f12 in which the dirt is checked again. This process is repeated predetermined times Nc1. In the case that the head is not made clean if the head cleaning operation is repeated Nc1 times, a warning indicating that the magnetic head is abnormal is issued (step f16). The sensor notifies the upper controller of the fact so that the upper controller may force the device to fall into the waiting state (step f17) until the check and repair of the head are terminated. The head cleaning may be managed on the repetition times Nc1 or a head cleaning time Tc1.

If it is determined that the magnetic head is not dirty at the step f13, the check and cleaning tape is unloaded (step f19), a timer is reset for starting to count the time (step f20). Later, as monitoring the time (step f22), the operation returns to the step f2 at each fixed time so that this head maintenance system may be automatically started for maintaining the head. The start of the head maintenance system has to be done after no access is given to the magnetic recording and reproducing unit 1 (step f23). It means that priority is placed on the recording and reproduction of the data rather than the head maintenance.

This head maintenance system is basically started on the result of monitoring the time. In addition, if an occurrence ratio of an error about data is increased to a certain value when recording and reproducing the information or the retrying times of recording and reproducing the information are increased to a certain value, the head maintenance system is forcibly started.

Figure 7:
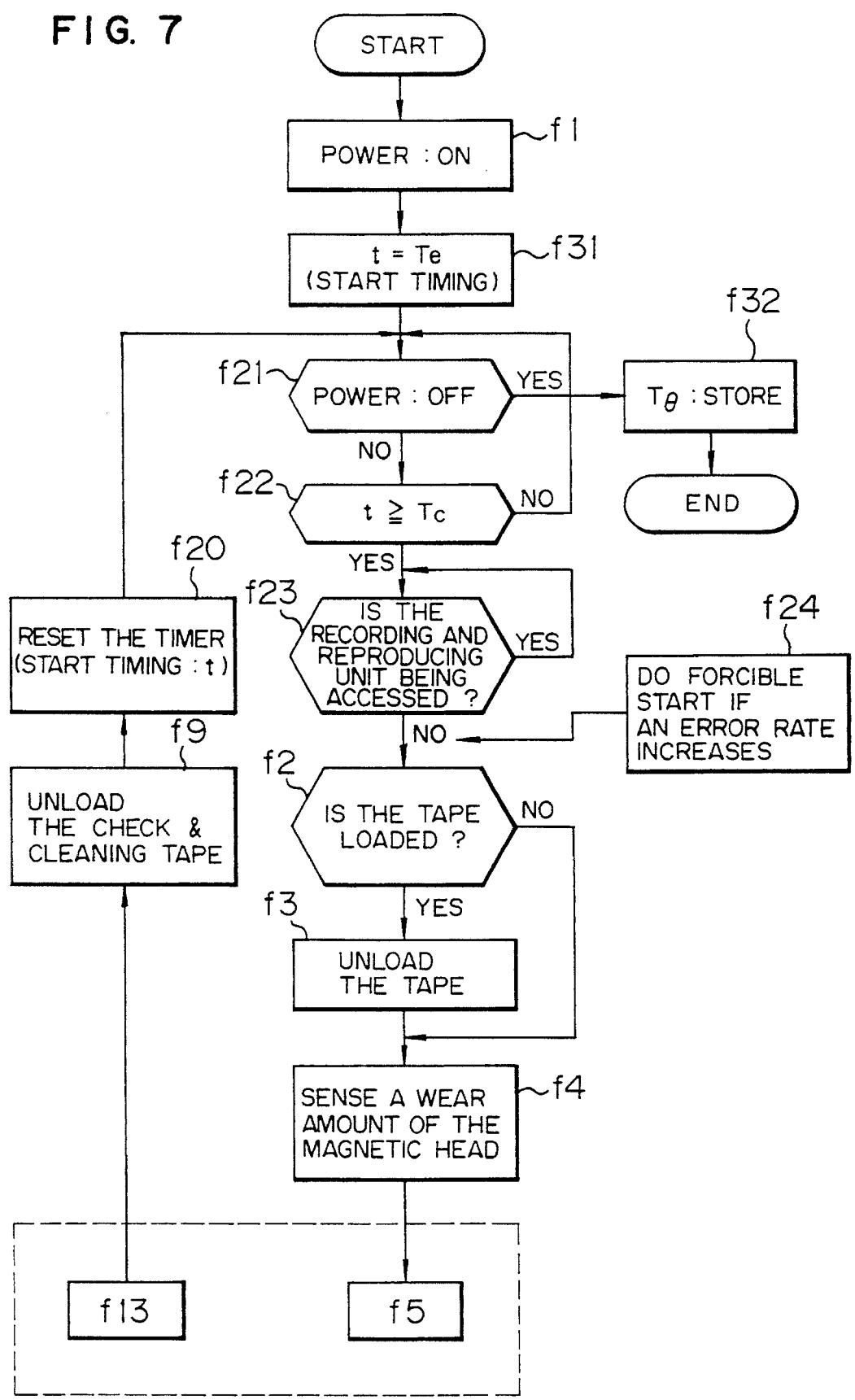
FIG. 7 is a flowchart showing a head maintenance method in the case of executing the head maintenance, based on the using time of the head.
Figure 8:
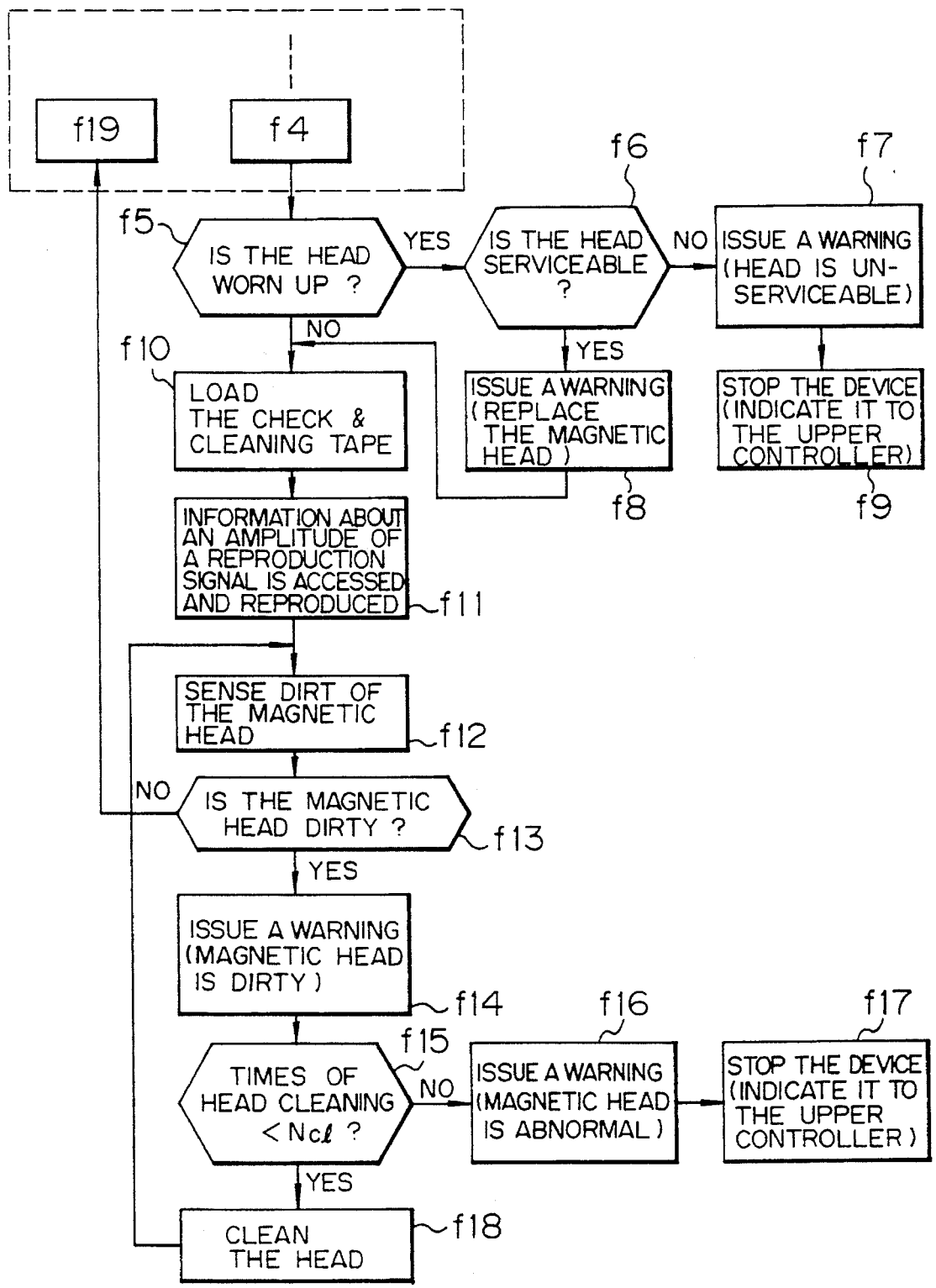
FIG. 8 is a flowchart showing a head maintenance method in the case of executing the head maintenance, based on the using time of the head.

FIGS. 7 and 8 show another embodiment in which the head maintenance is executed on a time passed since the previous head maintenance without having to do the head maintenance when powered.

In this embodiment, when the device is powered off, a time passed since the previous head check is stored in a nonvolatile storage unit like an external storage unit (step f32). When powered, the passage time is read from the storage unit and is set to the timer (step f31) for counting the time passed since the previous head check. In this system, the head checking is done at substantially regular time intervals. The other functions are the same as those of the embodiments shown in FIGS. 5 and 6. Hence, these functions are not described herein.

Like the embodiments shown in FIGS. 5 and 6, if the type and the characteristic of the tape are limited and the reference value of the reproduced signal amplitude is limited, it is not necessary to record the information about the reproduced signal amplitude on the check and cleaning tape Hence, the process (step f11) for accessing the information about a reproduced signal amplitude and reproducing it is allowed to be eliminated. The information about a reproduced signal amplitude may be stored in a ROM 42 or a RAM 43.

Figure 9:
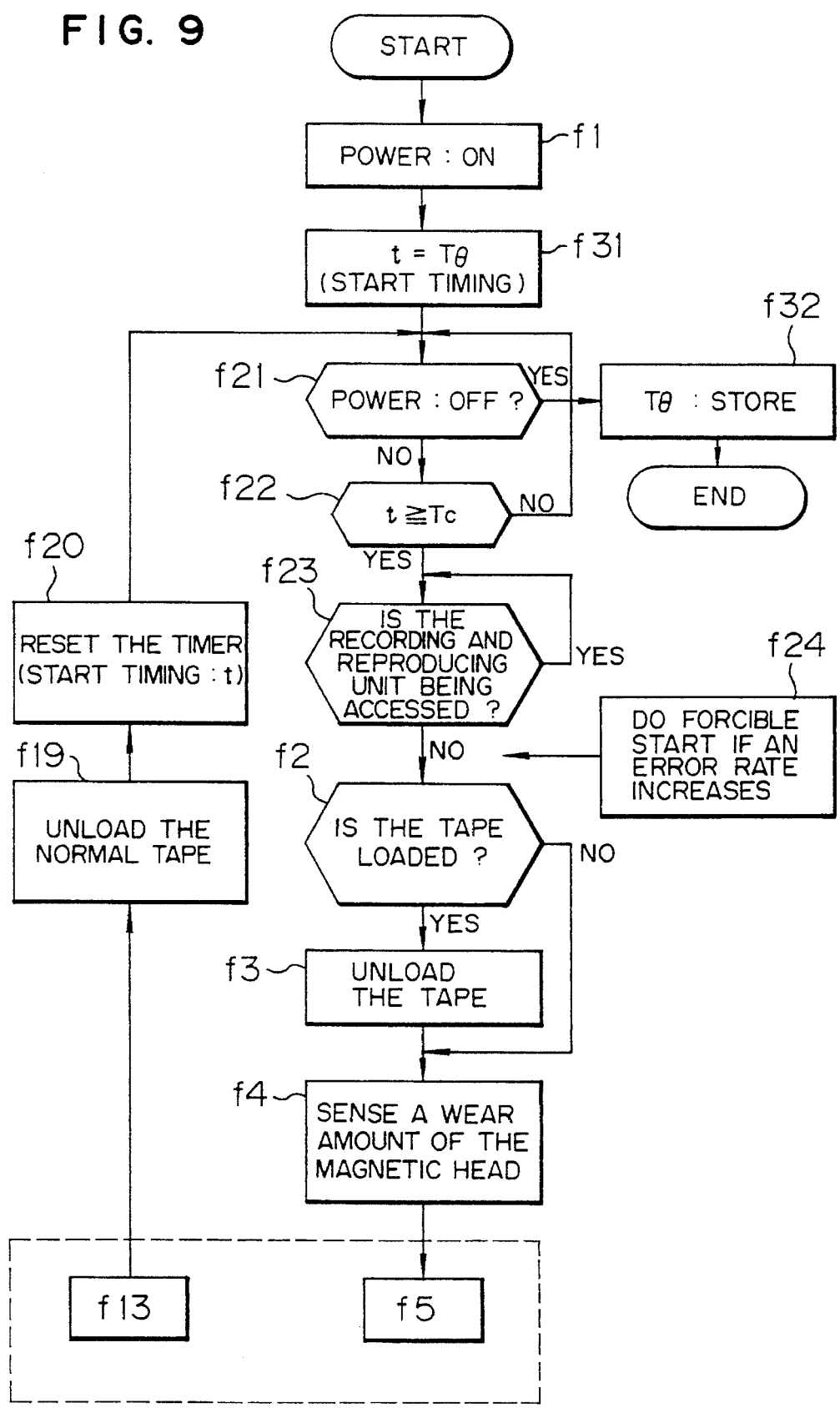
FIG. 9 is a flowchart showing a head maintenance method in the case of using a normal tape.
Figure 10:
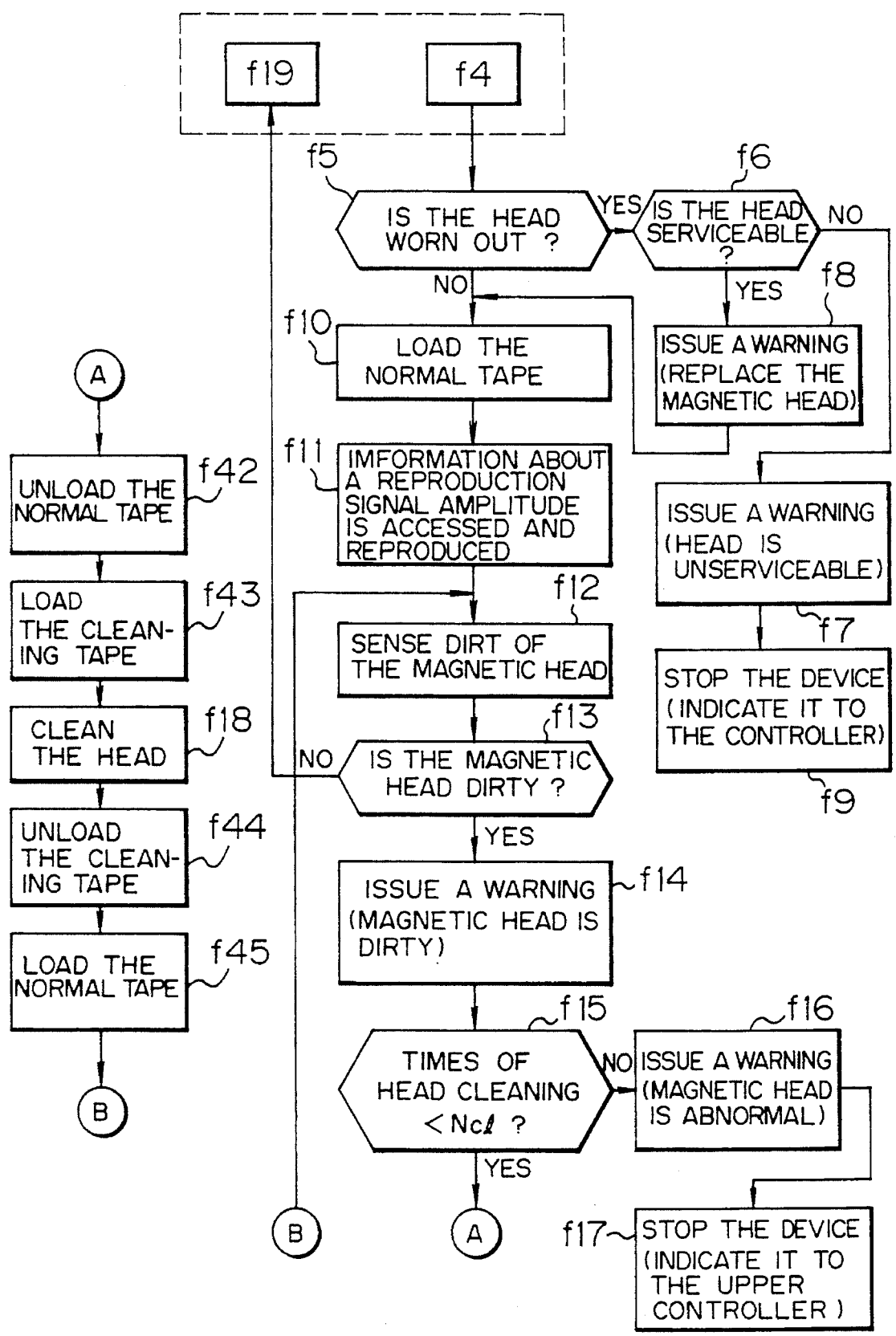
FIG. 10 is a flowchart showing a head maintenance method in the case of using a normal tape.

FIGS. 9 and 10 show another embodiment in which a normal tape is used by the user (referred to as "normal tape") in place of the dedicated head check tape.

In this embodiment, when sensing of the wear amount of the magnetic head is terminated, at first, a normal tape is loaded to the device and the information about a reproduced signal amplitude and a signal recorded with a fixed frequency or a fixed wavelength, both of which are recorded on the tape, are sequentially accessed and reproduced (step f11). The information about reproduced signal amplitude is used for the foregoing purpose. The signal recorded with a fixed frequency or a fixed wavelength is used for determining the dirt of the magnetic head based on its amplitude. That is, each normal tape holds information about a reproduction signal amplitude and a signal recorded with a fixed frequency or a fixed wavelength in advance.

In this embodiment, when cleaning the head, this embodiment needs to take the steps of unloading the normal tape (step f42) and loading the cleaning tape (step f43). When the head cleaning is terminated, it also needs to take the steps of unloading the cleaning tape (step f44) and loading the normal tape (step f45). Hence, the repetition of the head cleaning and sensing of the dirt may prolong a loss time. To overcome this possible shortcoming, it is desirous to employ the method of providing nearby the head a member (cleaning member) for cleaning the head.

Figure 11:
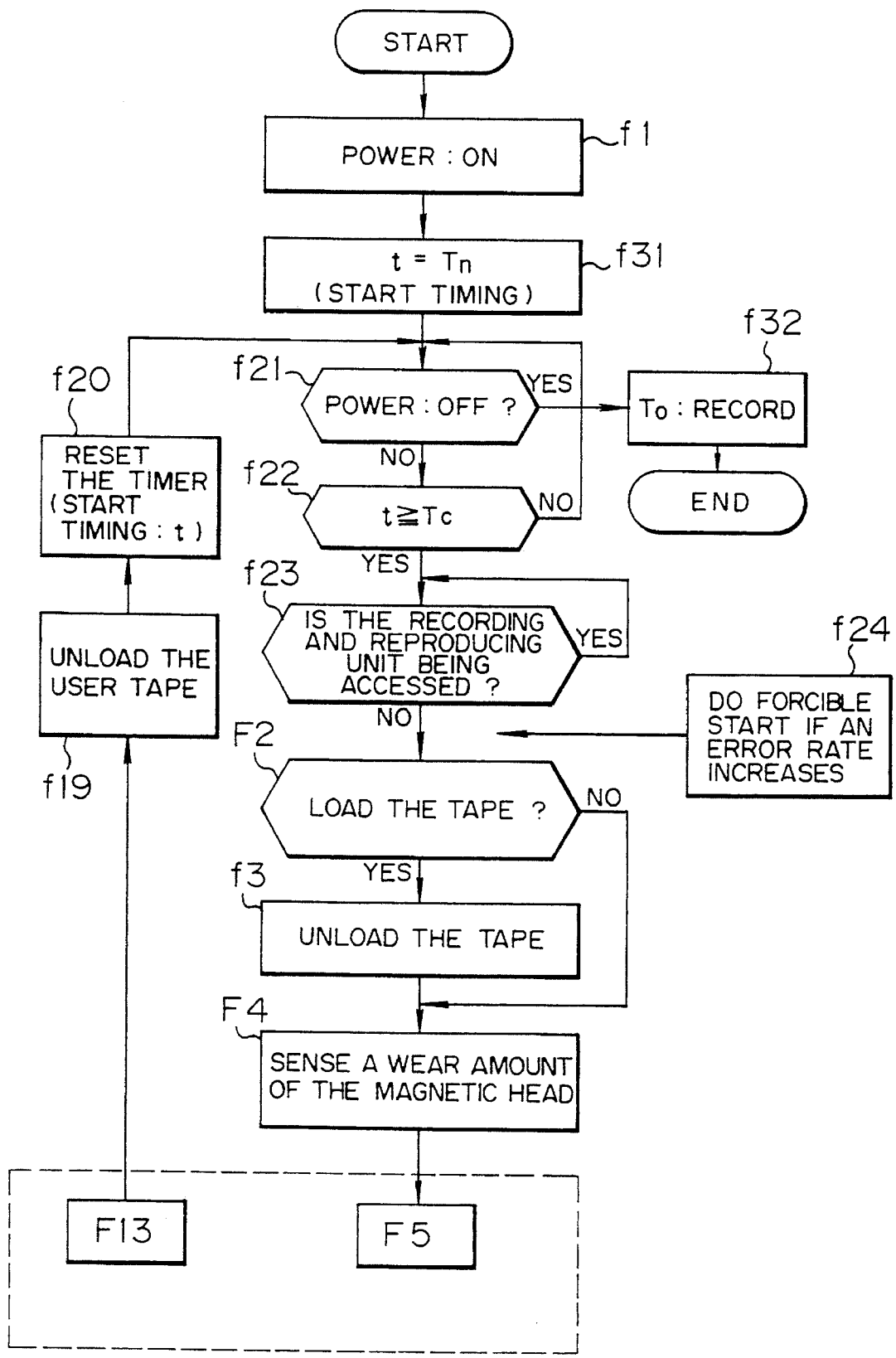
FIG. 11 is a flowchart showing a head maintenance method in the case of using a normal tape.
Figure 12:
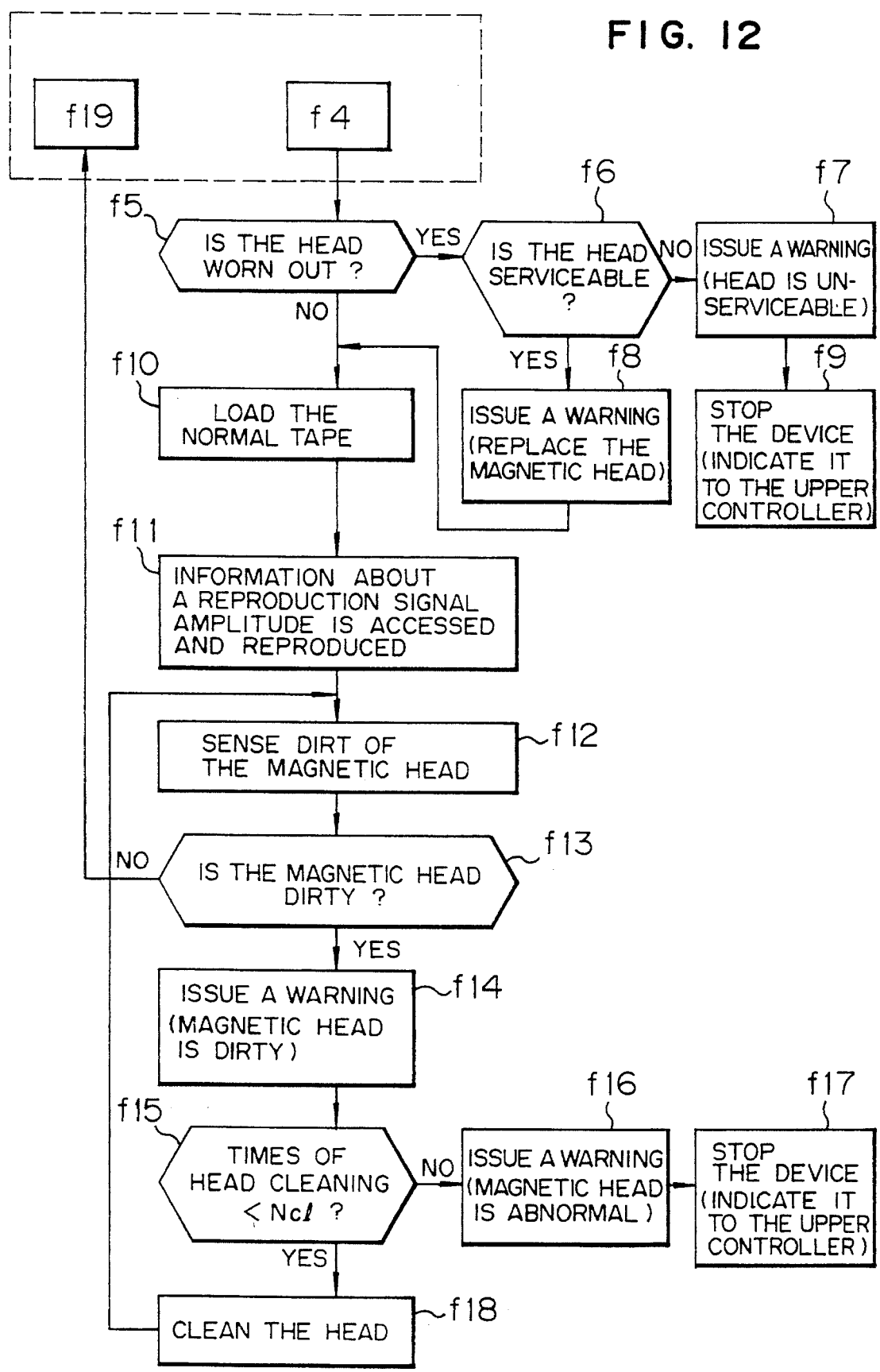
FIG. 12 is a flowchart showing a head maintenance method in the case of using a normal tape.

FIGS. 11 and 12 are flowcharts showing the head cleaning to be executed by the cleaning member. As shown, it is possible to eliminate from the flows shown in FIGS. 11 and 12 the process for unloading the normal tape (step f42), loading the cleaning tape (step f43), unloading the cleaning tape (step f44), and loading the normal tape (step f45) as shown in FIGS. 9 and 10. The head cleaning (step f18) is executed as the cleaning member comes into contact with the magnetic head. In the embodiment shown in FIGS. 9 and 10 or FIGS. 11 and 12, if the type or the characteristic of the tape is limited, as described in the embodiment shown in FIGS. 5 and 6 or FIGS. 7 and 8, it is not necessary to record the information about a reproduction signal amplitude on the tape.

FIGS. 16 and 17 or FIGS. 18 and 19 show another embodiment in which the steps f71, f73 and f75 of loading a check tape and the steps f72, f74 and f76 of unloading the check tape are provided in place of the steps f10 and f45 of loading the normal tape and the steps of f19 and f42 of unloading the normal tape included in the embodiment shown in FIGS. 9 and 10 or FIGS. 11 and 12. The check tape does not provide a function of cleaning the magnetic head and is used for dedicatedly estimating a reproduced signal amplitude for sensing the dirt of the magnetic head. That is, the check tape is the substantially same as but is different from the user tape in the respect that the characteristic of the check tape is defined to constantly keep the resulting reproduced signal amplitude substantially constant if both of the tapes keep the same condition of recording a signal. The other respects of these embodiments are the same as those of the embodiments shown in FIGS. 9, 10 and 11, 12. Hence, these respects are not described herein. The use of such a dedicated tape makes it easy to estimate the reproduced signal amplitude.

To use a member for cleaning the head in the embodiments shown in FIGS. 5, 6 and 7, 8, the steps of loading and unloading the check tape are provided in place of the steps of loading and unloading the check and cleaning tape. In this case, when cleaning the head (step f18), the cleaning member comes into contact with the magnetic head.

Figure 13:
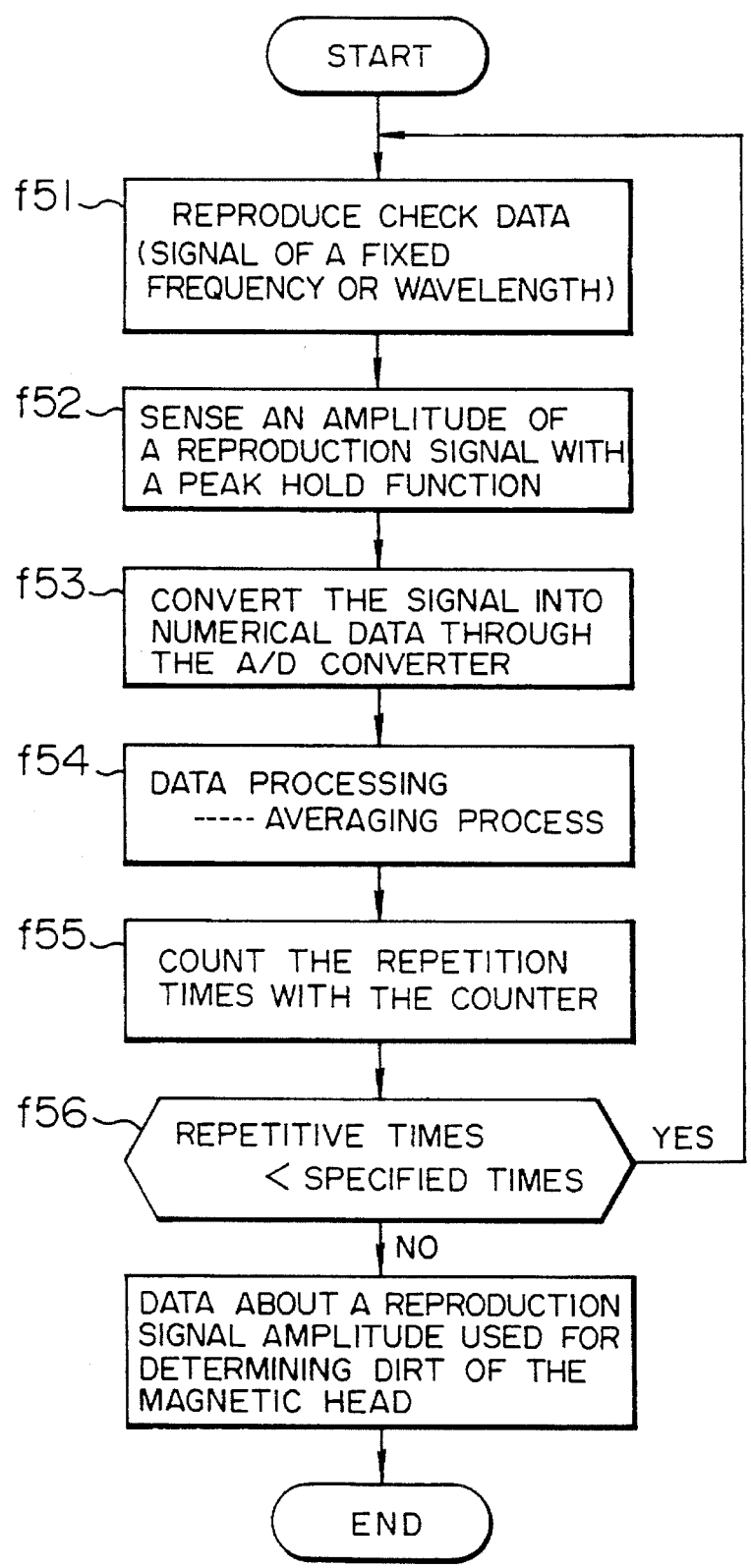
FIG. 13 is a flowchart showing a method for sensing dirt of a magnetic head.
Figure 14:
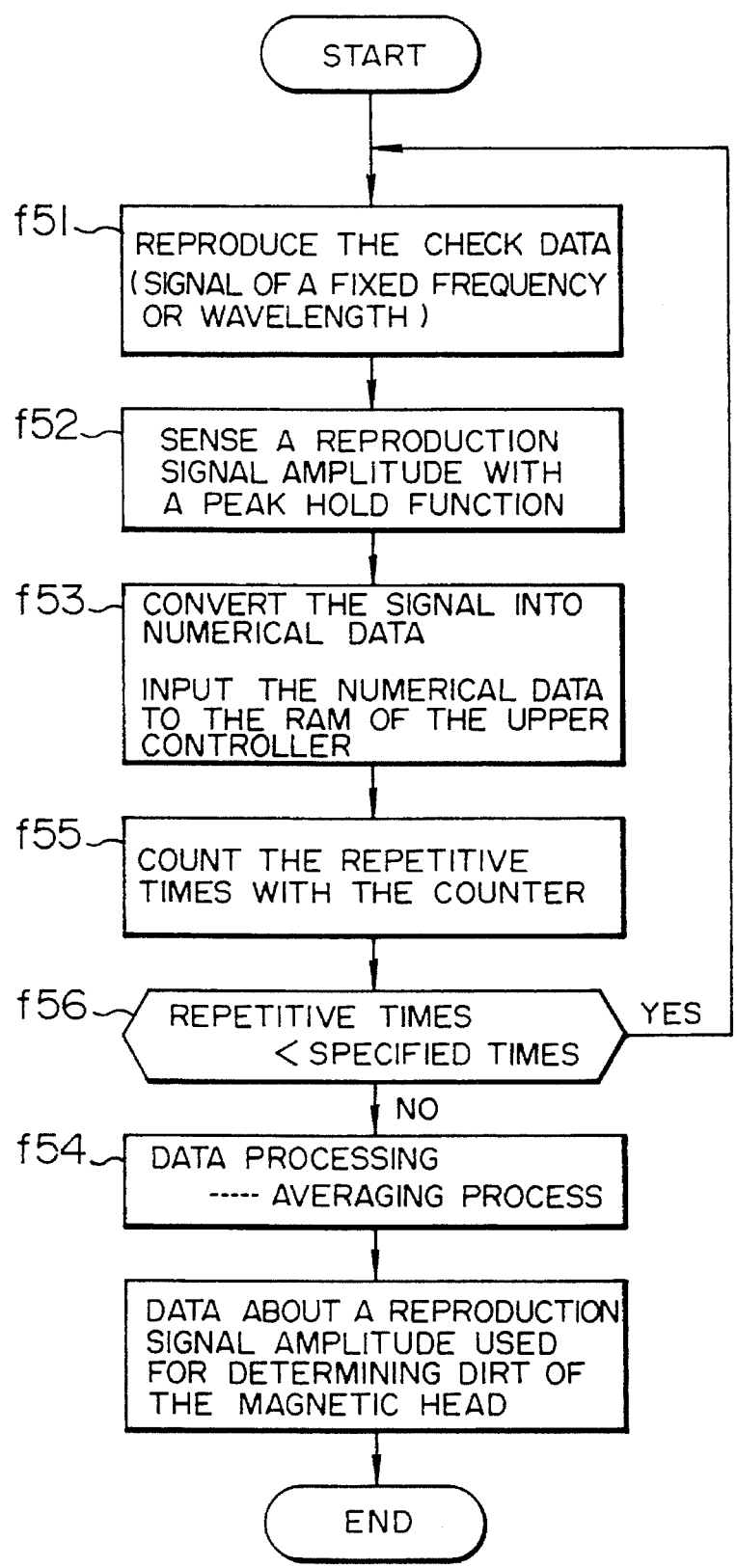
FIG. 14 is a flowchart showing another method for sensing dirt of a magnetic head.

FIG. 13 shows a detail of a procedure for sensing dirt of the magnetic head according to change of a reproduced signal amplitude. At first, a signal of a fixed frequency is reproduced (step f51). The reproduced signal amplitude is detected by holding the peak of the signal (step f52). The reproduced signal amplitude is analog-to-digital converted into numerical data (step f53) for processing the signal data (step f54). The method of processing data may be an averaging process. The repetitive number of the process is counted by a counter (step f54). After the process is repeated predetermined times (step f56), the dirt of the head is determined on the data r1. As shown in FIG. 14, after sampling of the data is repeated the predetermined times, the sampled data is processed as a batch.

Figure 15:
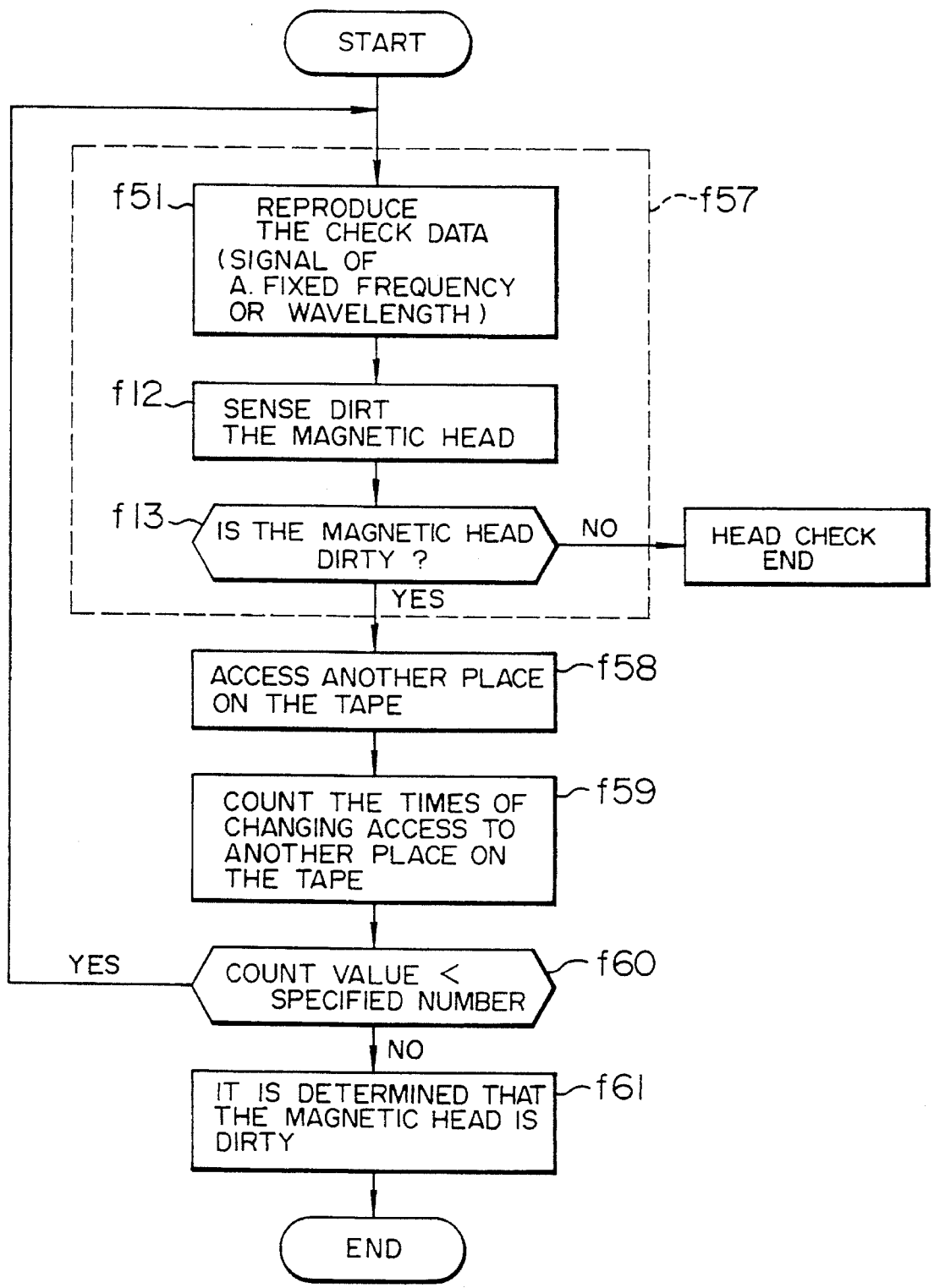
FIG. 15 is a flowchart showing another method for sensing dirt of a magnetic head.
Figure 16:
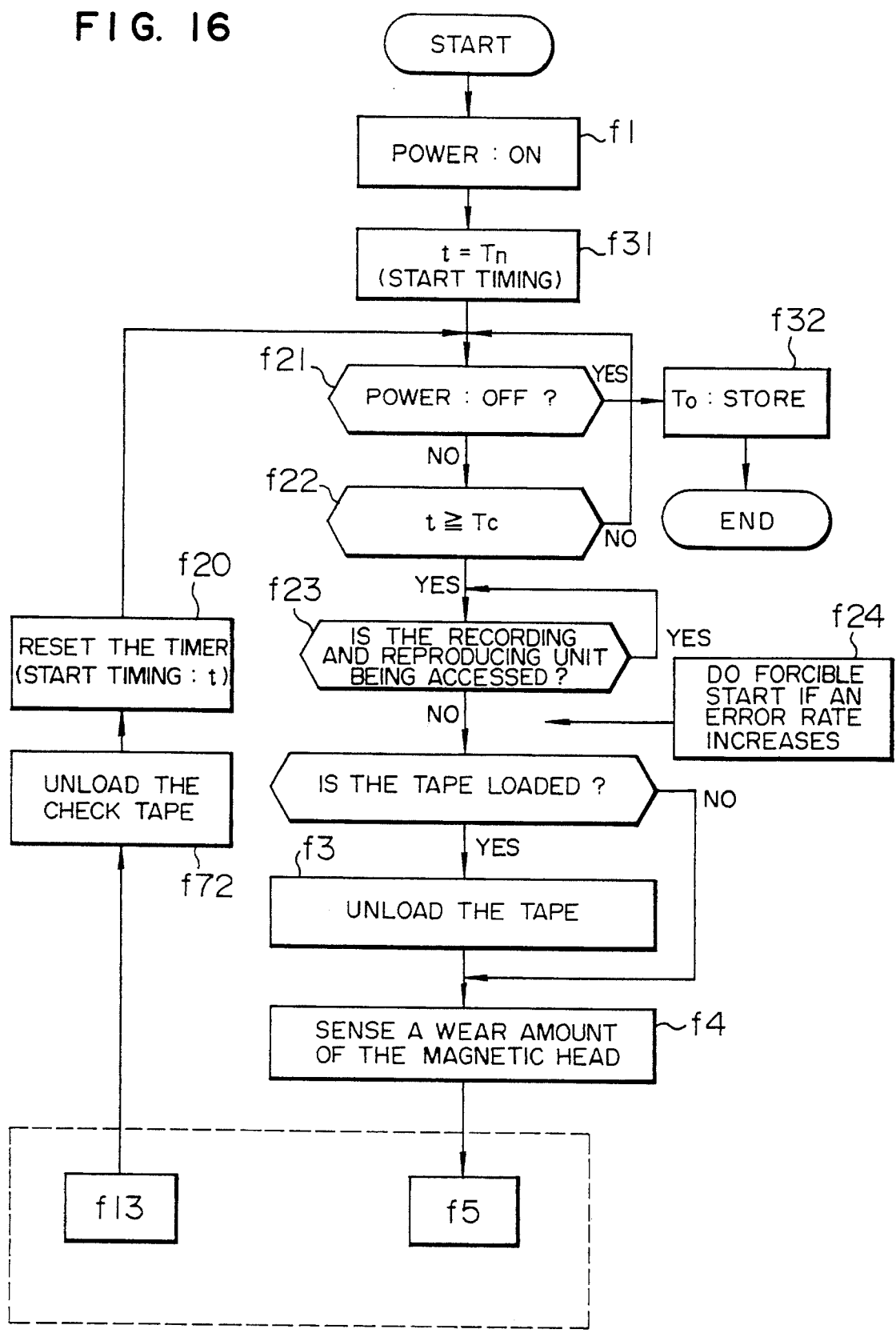
FIG. 16 is a flowchart showing a head maintenance method in the case of using a check tape and a cleaning tape.
Figure 17:
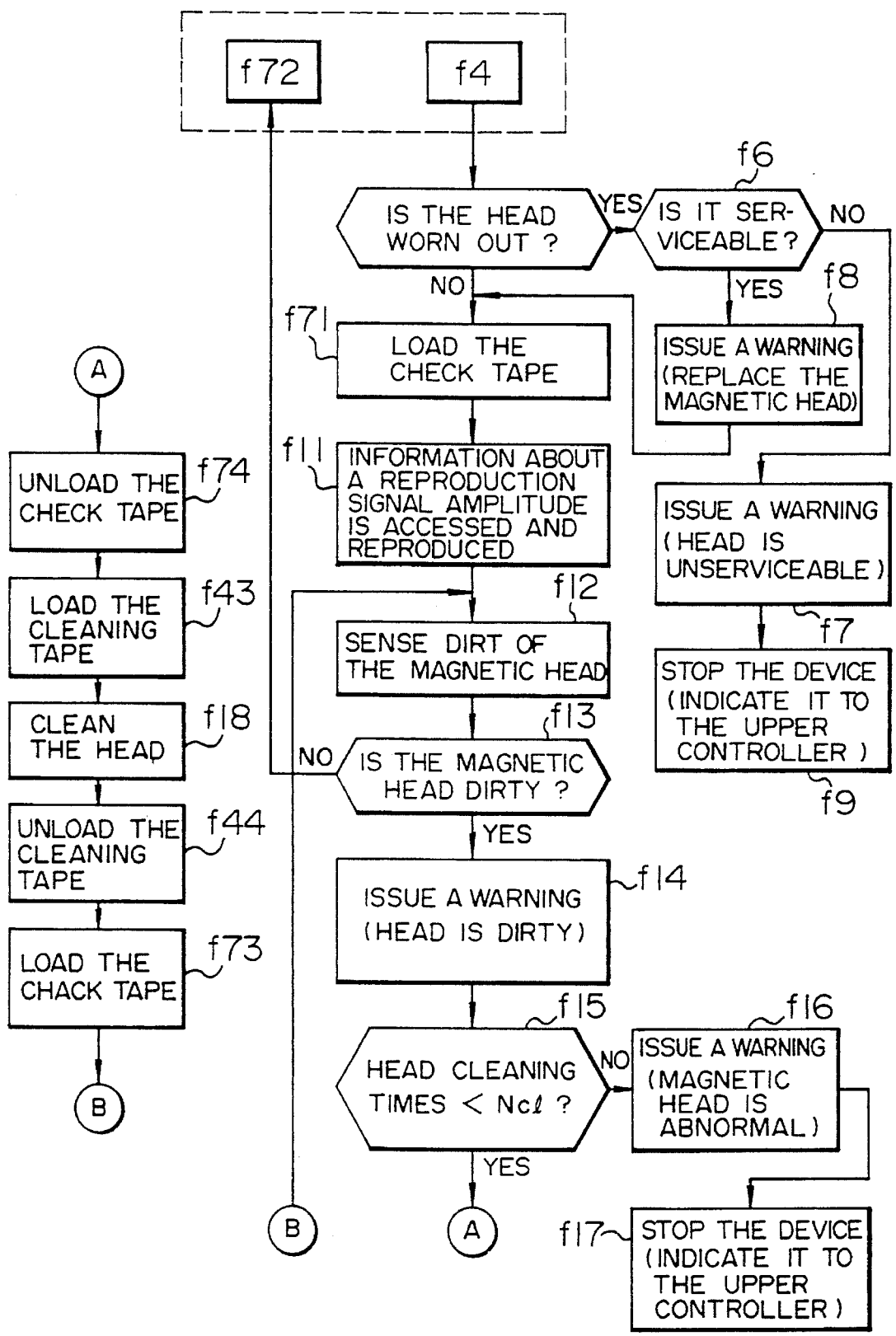
FIG. 17 is a flowchart showing a head maintenance method in the case of using a check tape and a cleaning tape.
Figure 18:
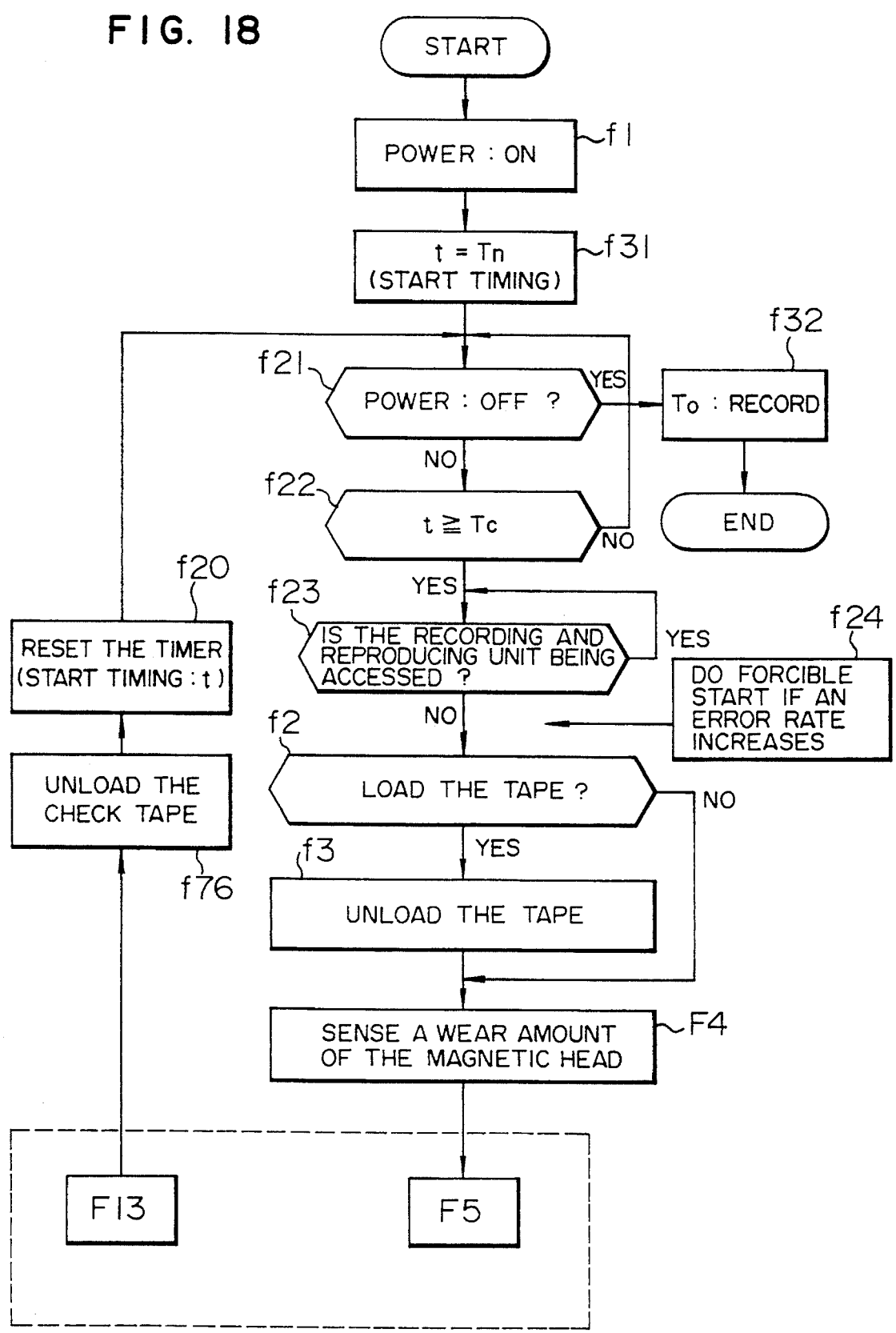
FIG. 18 is a flowchart showing a head maintenance method in the case of using a check tape.
Figure 19:
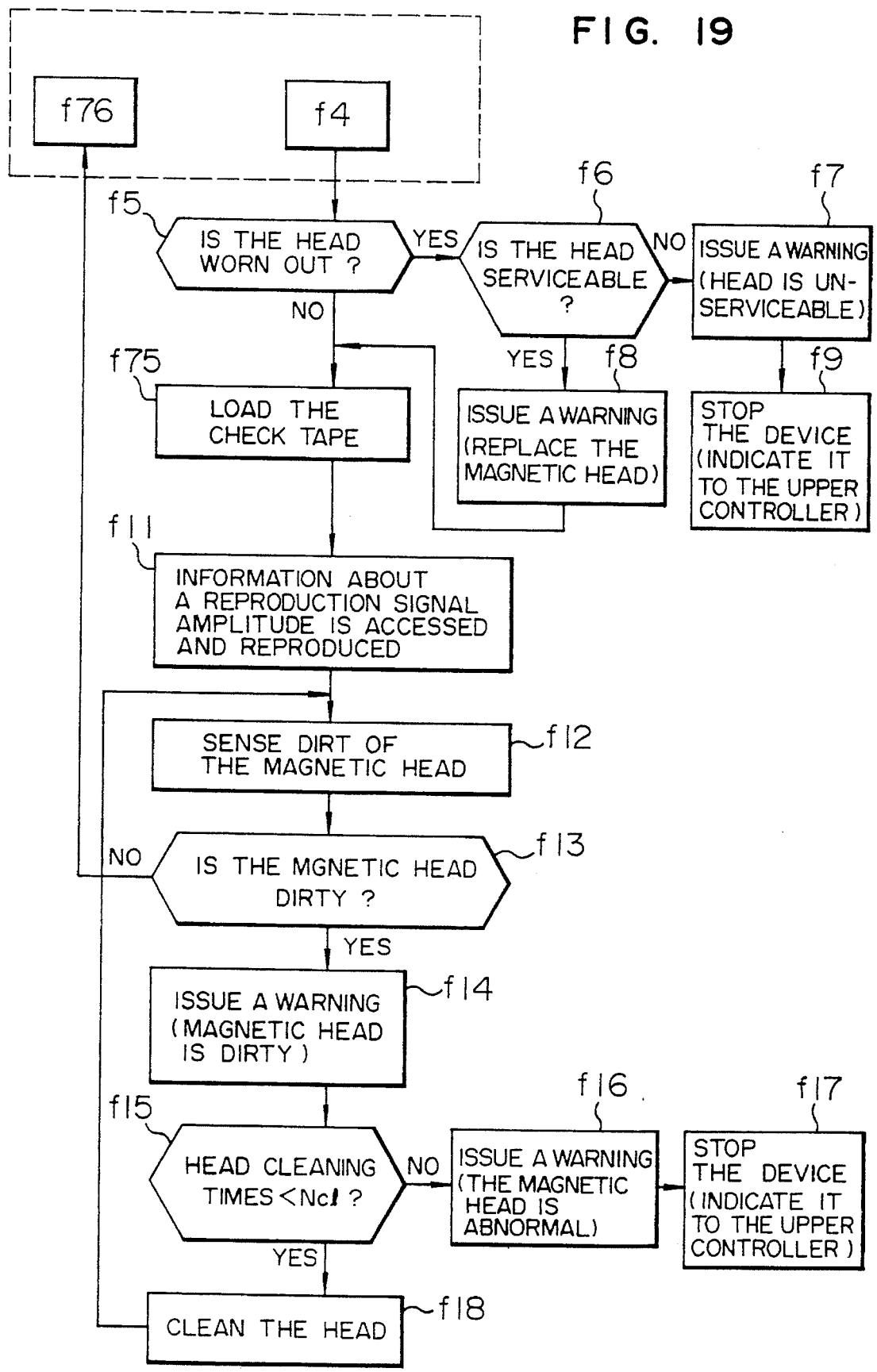
FIG. 19 is a flowchart showing a head maintenance method in the case of using a check tape.

FIG. 15 shows a procedure for sensing dirt of the head by reproducing a signal of a fixed frequency or a fixed wavelength recorded on a different place. Along the procedure shown in FIG. 13 or 14, the dirt of the magnetic head is sensed (step f57). If it is determined that the magnetic head is dirty, the operation is executed to access a signal of a fixed frequency or a fixed wavelength recorded on another place (step f58) and reproduce it (step f51) for repetitively executing the sensing (step f57). Then, the number of accesses on another place is counted (step f59) and the access is repeated until the access number reaches the predetermined times (step f60). Even after the access is repeated the predetermined times, if the determination f13 indicates the head is dirty, it is finally determined that the magnetic head is dirty (step f61). With this operation, when sensing the dirt of the head, the adverse effect of a defect of the tape is allowed to be considered. This may enhance the reliability of the sensing.

In all the foregoing embodiments, a signal of a fixed frequency or a fixed wavelength is pre-recorded for sensing change of the reproduced signal amplitude standing for dirt of the magnetic head. In place, when checking the head, it is possible to record a signal of a fixed frequency or a fixed wavelength.

Further, in all the foregoing embodiments, in place of the procedure described above, after loading the check and cleaning tape, the check tape or the normal tape, the process for sensing the wear amount of the magnetic head may be performed.

In all the foregoing embodiments, the magnetic tape is used as a magnetic recording medium. In place, it goes without saying that the present invention may apply to a magnetic head provided in the magnetic recording and reproducing device for recording and reproducing information on a disk-like magnetic recording medium.

What is claimed is:

1. A magnetic tape library arranged to automatically store plural magnetic tapes, pick up a magnetic tape from a desired storage place, load said picked-up magnetic tape to a magnetic recording and reproducing unit, and return said magnetic tape to said storage place with a robot, comprising:

wear amount sensing means for sensing an amount of wear of a magnetic head provided in said magnetic recording and reproducing unit;

dirt sensing means for sensing dirt of said magnetic head;

warning means for issuing a warning corresponding to the sensed state of the wear and/or dirt of said magnetic head;

head cleaning means for cleaning said magnetic head; and a controller for controlling said wear amount sensing means and said dirt sensing means, determining the state of the wear and the dirt of said magnetic head based on the outputs of said sensing means, and controlling a stop or start of said head cleaning means in accordance with a determined result, wherein said magnetic recording and reproducing unit includes a plurality of magnetic recording and reproducing devices, said plural magnetic tapes being stored in a plurality of magnetic tape storage locations, said robot automatically picking up a magnetic tape from a desired one of said plurality of tape storage locations and loading the picked-up magnetic tape into a desired one of said plurality of magnetic recording and reproducing devices and returning said magnetic tape to said one storage location from said one magnetic recording and reproducing device, said wear amount sensing means for sensing an amount of wear of a magnetic head being provided for each magnetic recording and reproducing device for detecting an amount of wear of said magnetic head of said magnetic recording and reproducing device, said dirt sensing means for sensing dirt of said magnetic head being provided for each magnetic recording and reproducing device for detecting dirt of said magnetic head of said magnetic recording and reproducing device, said controller controlling said wear amount sensing means at a predetermined timing, and in response to a result indicating that the sensed wear has exceeded a predetermined amount, stopping utilization of the magnetic recording and reproducing device having said magnetic head therein, and initiating operation of said warning means, and said controller controlling said dirt sensing means in response to a sensed wear amount indicating continued service life for said magnetic head and controlling said cleaning means to initiate a cleaning operation of said magnetic head in response to a sensed dirt.

2. A magnetic recording and reproducing device for recording information on a magnetic recording medium or reproducing information from said medium through a magnetic head, comprising:

wear amount sensing means for sensing an amount of wear of said magnetic head;

dirt sensing means for sensing dirt of said magnetic head;

warning means for issuing a warning corresponding to a state of wear and/or dirt of said magnetic head;

head cleaning means for cleaning said magnetic head; and a controller for controlling said wear amount sensing means and said dirt sensing means, for determining the state of the wear and the dirt of said magnetic head based on the outputs of said sensing means, and controlling a stop or start of said head cleaning means in accordance with a determined result;

wherein said controller controls said wear amount sensing means at a predetermined timing, and in response to a sensed wear amount indicating continued service life for said magnetic head, controlling said dirt sensing means, and in response to a sensed dirt, controlling said cleaning means to initiate a cleaning operation of said magnetic head.

3. A magnetic recording and reproducing device for recording information on a magnetic recording medium or reproducing information from said medium through a magnetic head, comprising:

wear amount sensing means for sensing an amount of wear of said magnetic head by sensing change of impedance of said magnetic head;

dirt sensing means for sensing dirt of said magnetic head based on an amplitude of a reproduced signal reproduced by said magnetic head;

warning means for issuing a warning corresponding to wear and/or dirt of said magnetic head;

head cleaning means for cleaning said magnetic head; and a controller for controlling said wear amount sensing means and said dirt sensing means, determining the wear and the dirt of said magnetic head based on the outputs of both of said sensing means, and determining whether an operation including starts of said warning means and said head cleaning means is to be continued or stopped based on a determined result to instruct said determined operation;

wherein said controller controls said wear amount sensing means at a predetermined timing, and in response to a sensed wear amount indicating continued service life of said magnetic head controlling said dirt sensing means, and in response to a sensed dirt initiating operation of said cleaning means for said magnetic head.

4. A method for automatically maintaining a magnetic head provided in a magnetic recording and reproducing device for recording information on a magnetic recording medium or reproducing information from said medium through said magnetic head, comprising the steps of:

determining that a head maintenance is to be executed at a predetermined timing under control of a controller;

sensing an amount of wear of said magnetic head;

issuing a warning and/or stopping said magnetic recording and reproducing device in accordance with the status of a sensed wear;

if said magnetic head has no problem about wear or comes closer to a serviceable threshold state and only said warning is issued, loading said magnetic recording medium to said magnetic recording and reproducing device;

sensing dirt of said magnetic head with said magnetic recording and reproducing medium;

cleaning said head and re-sensing dirt of said cleaned head in accordance with the status of a sensed dirt;

repeating said head cleaning and said re-sensing of the dirt of said head a specified number of times or until a specified amount of time is passed in accordance with the result of said re-sensing of the dirt; and stopping said device if it is determined that said magnetic head does not reach a serviceable threshold state as a result of sensing the dirt of said magnetic head and transmitting a signal indicating for said stop to a hierarchically upper controller;

wherein said sensing of an amount of wear of said magnetic head occurs prior to sensing dirt of said magnetic head.

5. A method as claimed in claim 4, wherein said sensing of the dirt of said magnetic head is carried out by reproducing information previously recorded on said medium and demodulating said recorded information.

6. A method as claimed in claim 4, wherein the operation at the step of sensing dirt of said magnetic head includes a substep of loading a dedicated magnetic recording medium for sensing dirt of said head to said magnetic recording and reproducing device and sensing dirt of said magnetic head with said dedicated magnetic recording medium.

7. A method as claimed in claim 4, wherein the execution timing of said head check is determined according to a time passed since the previous head check, an error occurrence ratio about data when recording or reproducing the data, or retry times of recording and reproduction and an actual operating state of said device.

8. A method as claimed in claim 4, wherein said signal indicating the stop may be used as a warning signal and serves to produce a warning.

9. A method for automatically maintaining a magnetic head provided in a magnetic recording and reproducing device for recording information on a magnetic recording med rum or reproducing information from said medium through said magnetic head; comprising the steps of:

determining that a head maintenance is to be executed at a predetermined timing using a controller;

sensing an amount of wear of said magnetic head;

issuing a warning corresponding to the status of said wear and stopping said device;

if said magnetic head has no problem about wear or comes closer to a serviceable threshold state and only said warning is issued, loading a dedicated magnetic recording medium to sense dirt of said head to said magnetic recording and reproducing device;

reproducing information previously recorded on said dedicated magnetic recording medium and demodulating said reproduce information;

issuing a warning, cleaning the head and re-sensing dirt of said cleaned head in accordance with the condition of the sensed dirt;

repeating said head cleaning and said re-sensing of the dirt a specified number of times or until a specified amount of time is passed in accordance with the re-sensed result of the dirt;

and if said magnetic head has no problem about wear or comes closer to a serviceable threshold state and said device is stopped, transmitting a signal indicating the fact to a hierarchically upper controller;

wherein said sensing of an amount of wear of said magnetic head occurs prior to sensing dirt of said magnetic head.

10. A method for maintenance of a magnetic head provided in a magnetic recording and reproducing device for recording information on a magnetic recording medium or reproducing information from said medium through said magnetic head, comprising the steps of:

determining that a head check is to be executed at a predetermined timing using a controller;

sensing an amount of wear of said magnetic head:

issuing a warning corresponding to the status of said sensed wear or stopping said device;

if said magnetic head has no problem about wear or comes closer to a serviceable threshold state and only said warning is issued, loading a dedicated magnetic recording medium for checking dirt of the head and cleaning said head to said device;

sensing the dirt of said magnetic head with said dedicated magnetic recording medium;

performing the issuance of said warning, said head cleaning, or said re-sensing of the dirt of said cleaned head according to the status of said dirt;

repeating said head cleaning and re-sensing of the dirt of said cleaned head a specified number of times or until the specified amount of time is passed according to the re-sensed result of the dirt; and if said magnetic head is unserviceable and said device is stopped, transmitting a signal indicating the fact to an upper controller;

wherein said sensing of an amount of wear of said magnetic head occurs prior to sensing dirt of said magnetic head.

11. A method as claimed in claim 10, wherein the sensing of the dirt of said magnetic head is carried out by reproducing information pre-recorded on said dedicated magnetic recording medium and demodulating said reproduced information.

\* \* \* \* \*